US011256708B2

(12) United States Patent
Klenk et al.

(10) Patent No.: US 11,256,708 B2
(45) Date of Patent: Feb. 22, 2022

(54) METHOD OF CREATING PROCESS PROTOCOLS

(71) Applicant: Celonis SE, Munich (DE)

(72) Inventors: Martin Klenk, Munich (DE); Alexander Rinke, Munich (DE)

(73) Assignee: Celonis SE, Munich (DE)

( * ) Notice: Subject to any disclaimer, the term of this patent is extended or adjusted under 35 U.S.C. 154(b) by 286 days.

(21) Appl. No.: 16/256,380

(22) Filed: Jan. 24, 2019

(65) Prior Publication Data
US 2020/0242114 A1    Jul. 30, 2020

(51) Int. Cl.
| G06F 16/21 | (2019.01) |
| G06F 16/25 | (2019.01) |
| G06N 5/00 | (2006.01) |
| G06F 16/2458 | (2019.01) |
| G06F 16/28 | (2019.01) |

(52) U.S. Cl.
CPC ........ *G06F 16/2465* (2019.01); *G06F 16/212* (2019.01); *G06F 16/2474* (2019.01); *G06F 16/254* (2019.01); *G06F 16/288* (2019.01); *G06N 5/00* (2013.01); *G06F 2216/03* (2013.01)

(58) Field of Classification Search
CPC .. G06F 16/258; G06F 2216/03; G06F 40/177; G06F 16/254; G06F 16/2465; G06F 16/212; G06F 16/288; G06F 16/2474; G06F 215/03; G06N 20/00; G06N 5/00
See application file for complete search history.

(56) References Cited

U.S. PATENT DOCUMENTS

| 2005/0171833 A1* | 8/2005 | Jost ........................ G06Q 10/06 |
| | | 705/7.38 |
| 2011/0178974 A1* | 7/2011 | Sayal ..................... G06N 5/022 |
| | | 706/50 |
| 2017/0068705 A1* | 3/2017 | Rinke ....................... G06F 9/50 |
| | | 707/999.003 |
| 2017/0213167 A1* | 7/2017 | Rinke ................. G06F 16/2465 |
| | | 707/999.003 |

FOREIGN PATENT DOCUMENTS

EP    3 139 289 A1    3/2017

OTHER PUBLICATIONS

European partial search report issued for corresponding EP Application No. 20153403.9 dated May 6, 2020 with machine generated translation.
Van der Aalst, "Process Mining: Getting the Data," Springer-Verlag Berlin Heidelberg, pp. 95-123, Jan. 1, 2011.

* cited by examiner

*Primary Examiner* — Yuk Ting Choi
(74) *Attorney, Agent, or Firm* — Myers Wolin, LLC

(57) ABSTRACT

A computer-implemented method of creating a process protocol in a local computer system is provided. The local computer system comprises a processor and a storage device, wherein the process protocol is created from raw data, which is stored in part in a first external computer system and in part in a second external computer system, wherein the raw data in the external computer systems is stored in a number of data tables, wherein the raw data comprises data, which is created during the execution of processes in the first external computer system and in the second external computer system.

14 Claims, 2 Drawing Sheets

METHOD OF CREATING PROCESS PROTOCOLS

TECHNICAL FIELD

The invention relates to a method of creating process protocols, wherein the data for which the process protocols are to be created, is stored in a distributed IT infrastructure, i.e., on different computer systems.

BACKGROUND

Real processes, as business processes (e.g., an order process) or technical processes (e.g., a coating process) often are executed in a computer system or with the aid of a computer system. Hereby, such a process may comprise several process steps. Each process step may create data during the execution, which is stored in the computer system, in which the process is carried out or with the aid of which the process is carried out.

It is known to analyze processes, which have been executed in a computer system or with the aid of a computer system. Hereby, information is extracted from the data created by the processes or by the respective process steps, which is relevant for the analysis of the processes. In this way, for example, the transactions carried out in an ERP system or the process steps carried out along a production/processing line can be analyzed in order to identify for example, bottlenecks or other anomalies in the processes. The analysis of the processes is carried out by means of a so-called Process Mining System. For a Process Mining System to be able to carry out such an analysis efficiently, the extracted information has to be available to the Process Mining System in a processed form. In the following, this processed form of the extracted information is referred to as a process protocol.

In prior art, the analysis of the processes is carried out in the computer system, in which the data has been created and stored. Hereby, it is disadvantageous that only processes, which have been executed in the respective computer system, can be analyzed.

In practice, it may happen that partial processes of a process are carried out on different computer systems, and consequently, also create data on different computer systems. Thus, for example, the ordering information for an order process and the history to it may be stored on a first computer system, while the data with respect to the sales and the vendor calls are stored in a second computer system. Hereby, the partial processes relating to the orders are executed in the first computer system, and the partial processes relating to the vendor calls are executed in the second computer system. With respect to technical processes, as production processes, different partial processes may be executed on different production units, whereby the data of the partial processes may be stored in different computer systems. For example, information relating to the assembly process may be stored in a first computer system, and information relating to a subsequent technical test process may be stored in a second computer system.

The partial processes executed on the first computer system can be analyzed by means of methods known from prior art. Also, partial processes executed on the second computer system can be analyzed, however, only independently of the partial processes executed on the first computer system. An analysis of the overall process, thereby, is not possible.

SUMMARY

Therefore, it is an object of the present invention to provide solutions, which allow for an efficient and simple analysis of processes, which have been executed in different computer systems and/or by different processing units.

According to the invention, this object may solved by a method according to the independent claim. Preferred embodiments and further developments of the invention are defined in the dependent claims.

Accordingly, a computer-implemented method of creating a process protocol in a local computer system is provided, where the local computer system comprises a processor and a storage device, wherein the process protocol is created from raw data, which is stored in part in a first external computer system and in part in a second external computer system, wherein the raw data in the external computer systems is stored in a number of data tables, wherein the raw data comprises data, which is created during the execution of processes in the first external computer system and in the second external computer system, and wherein the method comprises:

(a) importing the data tables from the first external computer system and from the second external computer system into the local computer system, and storing the imported data tables in the storing device of the local computer system, (b) in the local computer system, reconstructing the relationships between the imported data tables, (c) in the local computer system, determining and selecting a first data table from the number of imported data tables, which comprises objects for which the process protocol is to be created, (d) in the local computer system, determining and selecting a number of second data tables from the number of imported data tables, which are necessary for the creation of the process protocol, based on the selected first data table and based on the relationships between the imported data tables, (e) in the local computer system, creating an executable transformation, which based on the selected first the data table, the selected second data tables, and on the relationships between the selected first data table and the selected second data tables is adapted to extract data from the first data table and from the second data tables, and to store the extracted data as process protocol, and (f) in the local computer system, executing the transformation and storing the extracted data as process protocol, and providing the created process protocol to a Process Mining System for analysis and reconstruction of the processes carried out in the first external computer system and in the second external computer system.

In one embodiment of the invention at least one of the selected data tables may be imported from the first external computer system, and at least one of the selected data tables may be imported from the second external computer system.

In one embodiment of the invention, during execution of the transformation in the step (f), the data may be extracted from the data tables stored in the external computer systems.

In one embodiment of the invention, during reconstructing of the relationships between the imported data tables in the step (b), it may be determined via which attributes the data tables are related to each other.

In one embodiment of the invention two data tables may be related to each other, if an attribute of the one data table is identical or similar to an attribute of the other data table. Examples: attribute "Customer" of a first data table is identical to the attribute "Customer" of a second data table; attribute "Customer Number" of a first data table is similar to the attribute "Customer No." of a second data table.

In one embodiment of the invention the relationships reconstructed between two imported data tables may be stored, wherein the names of the two data tables, the respective attributes, and an assignment of the attributes of the one data table to the attributes of the other data table are stored.

In one embodiment of the invention
  a first data model belonging to the data tables imported from the first external computer system may be imported from the first external computer system into the local computer system, wherein the relationships between the data tables imported from the first external computer system are reconstructed based on the first data model,
  a second data model belonging to the data tables imported from the second external computer system may be imported from the second external computer system into the local computer system, wherein the relationships between the data tables imported from the second external computer system are reconstructed based on the second data model, such that only the relationships between the data tables from the first external computer system and the data tables from the second external computer system have to be reconstructed without the use of a data model.

In one embodiment of the invention, during determining and selecting of a first data table in the step (c), it may be determined, which data table meets one or more conditions, wherein the conditions are selected from a group, consisting of
  the data table comprises less data sets compared to the other data tables,
  the data table comprises an attribute, in which the time stamps are stored,
  the data table is referenced by a few other data tables, and combinations thereof.

In one embodiment of the invention information with respect to the selected first data table may be stored with the storage device.

In one embodiment of the invention, during determining and selecting of the number of second data tables in the step (d) those data tables may be selected, which meet one or more conditions, wherein the conditions are selected from the group, consisting of
  the data tables comprise many data sets compared to the first data table,
  the data table is referenced directly or indirectly by the first data table,
  the data tables respectively comprise an attribute, in which the time stamps are stored,
  and combinations thereof.

In one embodiment of the invention information with respect to the selected second data tables and with respect to the relationships between the selected second data tables and the first data table may be stored with the storage device.

In one embodiment of the invention, during creating of the executable transformation in the step (e) it may be determined, which attributes of the selected first data table and of the selected second data tables are considered during extracting of the data.

In one embodiment of the invention, during executing of the transformation in the step (f) data sets may be read out from the first data table and from the second data tables, wherein the data sets, which have been read out, comprise the attribute values of the attributes determined for the respective data table, wherein the data sets, which have been read out, are stored as process protocol, wherein each data set stored in the process protocol represents a process step (a process step represents an event of a process) of a process executed in the first external computer system and in the second external computer system.

In one embodiment of the invention the data sets, which have been read out, may be stored according to a predetermined data structure in the process protocol, wherein the predetermined data structure comprises at least:
  a first attribute, in which a first unique identifier of the process of the respective process step is stored;
  a second attribute, in which an identifier of the respective process step is stored; and
  a third attribute, in which a sequence of the process steps within a process is stored.

In one embodiment of the invention the attribute values of the attributes of the process protocol may be determined from
  the attribute values of the data sets, which have been read out, and/or
  the table names and/or column names of the selected first data table and/or the selected second data tables.

BRIEF DESCRIPTION OF THE DRAWINGS

Details and features of the invention as well as concrete embodiments of the invention can be derived from the following description in connection with the drawing, in which.

DETAILED DESCRIPTION

Figure 1:
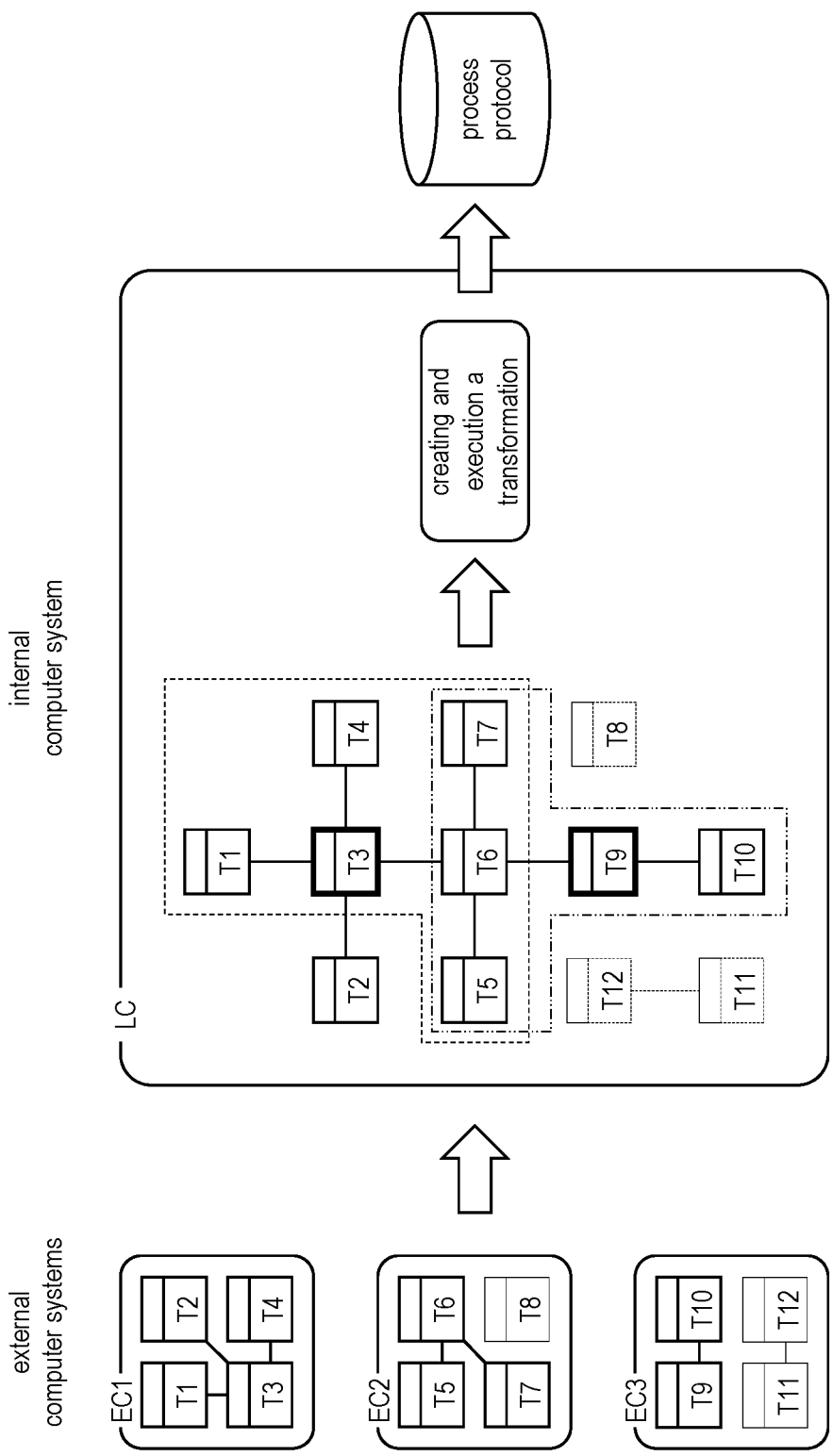
FIG. 1 shows a block diagram of an IT system with several computer systems, on the basis of which the method of creating process protocols according to the invention is explained.

FIG. 1 shows a block diagram of an IT system with several computer systems. Here, the IT system exemplarily consists of three external computer systems (EC1, EC2 and EC3) and of an internal computer system. Hereby, the terms "external" and "internal" only indicate that different computer systems are concerned. The computer systems are coupled to each other via a communications connection. In particular, the external computer systems respectively can be or are coupled to the internal computer system. With respect to the computer systems, so-called On Premise systems or cloud systems may be concerned.

According to an embodiment of the invention, the external computer systems EC1, EC2, EC3 may also be production facilities, processing facilities, or the like, which respectively comprise at least one data processing device. Preferably, the data processing device is coupled to a storage device, in which the data provided by the production facility, the processing facility, or the like is stored.

In the external computer systems, partial processes of a higher level process are executed. The higher level process also is referred to as the overall process. Thus, the overall process, exemplarily, may be a purchase process, which is executed or handled by means of the computer systems.

In the following, examples are described, in which the external computer systems are conventional computer systems. The examples are also applicable correspondingly for external computer systems, which are production facilities, processing facilities, or other technical facilities, wherein these facilities comprise a data processing system, such as a processor having a storage device, or are coupled to such a data processing system.

For the present invention, external systems EC1, EC2, EC3 may execute partial processes of a higher level overall process and provide data for the respectively executed partial processes, from which process protocols can be created for the higher level overall process according to methods according to the invention.

Also, more than three or less than three external computer systems may be provided.

Example

With respect to a first partial process of a purchase process, an order process may be concerned, by means of which the orders are handled. The order process, for example, is carried out in the first external computer system EC1. The data of the order process and the associated history are stored in the first computer system EC1.

With respect to a second partial process, vendor calls or suppliers may be concerned, for which orders have been created in the first computer system EC1. For example, the vendor calls are handled in the second external computer system EC2. The data with respect to the vendor calls and details of the suppliers as well as their vendors are stored in the second computer system EC2.

A third partial process belonging to the overall process may be carried out on the third external computer system EC3. The data of the third partial process is stored in the third computer system EC3.

In the example shown in FIG. 1, the overall process is carried out on three computer systems EC1, EC2, and EC3. An overall process, however, may also be carried out on more or less than three computer systems (within the meaning of the present invention, on at least two computer systems).

The respective data is stored in the respective computer systems in a structured form, for example, in tables T1 to T12 of a relational data base system. Hereby, different data base management systems and different data base technologies (relational, object oriented, hierarchical data base systems, etc.) may be used in each computer system. In the subsequent description, it is assumed that the data in the respective computer system is stored in tables of a relational database system, whereby the invention is not restricted to this.

The tables or the data of these tables have a distinct relationship to each other. In FIG. 1, these relationships are shown by the connecting lines between the tables T1 to T12 shown between the computer systems EC1 to EC3. In the respective computer systems EC1 to EC3, moreover, structure tables may be provided (not shown in FIG. 1), in which information with respect to the respective tables and their relationships to each other is stored. These structure tables, optionally, may be used for the creation of a process protocol according to the invention, as is explained in further detail below. These structure tables are also referred to as data model.

For the creation of the process protocol, at first, the data tables T1 to T12 are imported into the internal computer system.

Subsequently, the relationships between the imported data tables are reconstructed in the internal computer system, whereby, on the one hand, the relationships between the data tables imported from a certain external computer system, and, on the other hand, the relationships between the data tables of a computer system and the data tables of another computer system are reconstructed. For example, the relationships between the tables T1 to T4 (which have been imported from the computer system EC1) and between the tables T5 to T8 (which have been imported from the computer system EC2) are reconstructed. Moreover, the relationships between the tables T1 to T4 (which have been imported from the computer system EC1) and between the tables T5 to T9 (in FIG. 1, the relationship between the table T3 and the table T6, and the relationship between the table T6 and the table T9) are reconstructed. How these relationships are determined and reconstructed concretely will be described in further detail with reference to FIG. 2.

The connecting lines between the imported tables in the internal computer system show these reconstructed relationships.

After the relationships have been reconstructed, a database scheme exists in the internal computer system, which describes the tables and their relationships with respect to each other for all tables T1 to T12 imported from the external computer systems EC1 to EC3.

After the reconstruction of the relationships between the imported data tables T1 to T12, it is determined, which business objects are suitable for the creation of a process protocol. With reference to the example mentioned above, such business objects, for example, may be "orders" and "vendors". For example, the orders, here, are stored in the table T3 and the vendors are stored in the table T9. The determination of these business objects is described in further detail with reference to FIG. 2. The tables in the internal computer system, which store these business objects, which have been determined, have a bold print frame in FIG. 1.

According to a preferred embodiment of the method according to the invention, one of the business objects, which have been determined, is selected automatically, for example, the business object "orders". That means, that the table T3 is selected automatically. Hereby, the selection may be carried out based on predetermined requirements, as the number of data sets and/or the number of the time stamps stored in these tables and/or how often a table has been selected in the past (manually or automatically).

Alternatively, the selection of a business object (as far as several suitable business objects have been determined) may also be carried out by a user. Hereby, the business objects, which have been determined, are offered to the user for selection. The list of business objects may be sorted according to predetermined requirements, as the number of data sets, and/or the number of the time stamps stored in these tables, and/or how often a table has been selected in the past (manually or automatically).

In the further procedure, the selected business object, i.e., the selected table is used as base table for the creation of a process protocol.

Based on the base table (selected business object), those tables are selected from the further tables imported into the internal computer system, which are required for the creation of a process protocol or several different process protocols. Several different process protocols, for example, are possible, if, based on the base table, different activities can be analyzed by the means of the process protocols. With respect to the example of the business object "orders", for example, such activities may be price changes within an order process, or the vendor calls during an order process.

Based on the base table T3, and the (direct or indirect) relationships of the base table T3 to the other imported tables, in the example shown in FIG. 1, the tables T1 and T4 to T7 are selected (in FIG. 1 indicated by the dashed-lined frame). The selection of the further tables is based on whether the tables are suitable for the creation of a process protocol. For example, further tables (together with the base table) are then suitable for the creation of a process protocol, if the further tables, compared to the base table, respectively comprise many data sets, and/or the further table is referenced directly or indirectly by the base table, and/or the further tables comprise at least one attribute, in which a time stamp is stored. Further tables may also be suitable for the creation of process protocols, if they have already been used for the creation of process protocols previously.

With respect to the example shown in FIG. 1, the table T2, however, is referenced by the base table T3 directly. In this table T2, for example, only the type of the order is stored (e.g., online order, order by fax, order by mail, order by telephone). Accordingly, the table T2 does not have any time stamps and, compared to the base table, only has a few data sets. The table T2, thereby, is not relevant for the creation of process protocols.

If the table T9, in the example shown in FIG. 1, would be selected as base table (business object "vendor"), the system, for example, selects the further tables T5 to T7 and T10 as further table, which is relevant for the creation of a process protocol (in FIG. 1, indicated by the dot-dashed frame).

After the selection of the relevant further tables, the system, based on the base table and the associated further tables, determines activities for which a process protocol can be created. Based on the example of the base table T3 (orders) and the selected further tables T1 and T4 to T7, such activities, for example, may be the price changes within an order process, or the vendor calls during an order process.

Depending on the activity, if needed, different tables of the selected further tables are relevant for the creation of the process protocol.

If the price changes of an order including the relevant time stamps would be stored in the table T4, then, this table, besides the base table T3, would be relevant for a process protocol for analyzing the price changes of orders. Besides the changes of the price, also, changes of the order amounts including the associated time stamps can be stored in the table T4. For the activity "price changes in orders", this table would have to be filtered according to price changes, for the activity "change of the order amount", this table would have to be filtered according to the corresponding changes. For each activity, which has been determined, the system stores the filter criteria necessary for this (as far as required). Whether in table T4, a data set belongs to a price change or to an order amount change may be determined, for example, by means of an attribute, in which the type of the change is stored for each data set.

Besides these two activities, which are stored in the table T4, also, a common activity "change of the order" may be determined, for which no filter criteria would be necessary.

If the vendor calls including the relevant time stamps would be stored in the table T6, then, this table would not be relevant for a process protocol for analyzing the price changes of orders. In contrast, for a process protocol for analyzing the calls to the vendor within an order process, this table would be relevant.

Further activities may be the creation of an order or the confirmation of an order by the vendor. For this, no further table would be necessary, if the date is stored in the table T3, at which the order has been created, and a date at which the order has been confirmed.

For a process protocol for analyzing price changes of orders based on vendor calls during an order process, on the other hand, both tables T4 and T6 would be relevant.

The activities, which has been determined, may be part of a higher level process. Such a process, for example, may be the order process itself, which comprises the process steps (activities)

creation of an order,
price changes in orders,
vendor calls, and/or
confirmation of an order.

Also for such a process, a process protocol may be created. For this, referring to the example mentioned above, besides the base table T3, also the tables T4 to T6 would be relevant for the creation of a process protocol.

For each activity, which has been determined, the system stores, besides relevant filter criteria, if needed, also attributes/column names (plus, if needed, the associated table name), the values of which are necessarily required for the creation of a process protocol. Such a mandatory attribute is, for example, a time stamp, by means of which the sequence of the activities within a process is specified.

By means of a process protocol, which is created for the order process, a Process Mining System, which is provided with the process protocol, is able to analyze the order processes. For example, by means of a Process Mining System, it may be determined that for x % of the order processes more than y vendor calls have taken place, or that for x % of the order processes, at least y price changes have been made, or that x % of the order processes have been made within a certain time period.

From the activities, which have been determined, the system now may select one or more activities in order to create corresponding process protocols for these. For each selected activity, an own process protocol may be created. Also, for several determined activities, a common process protocol may be created (thus, for the activities of creating an order, price changes in orders, vendor calls, and confirmation of an order, a common process protocol may be generated for the process orders).

Alternatively, the user may also select from the activities, which have been determined, those activities, for which a (separate or a common) process protocol is to be created.

Due to the selected activities and the relationships between the tables, which have been determined, the system now is able to select the tables required for this, and, based thereon, to create at least one process protocol.

Based on the tables (base table and associated relevant further tables according to the selected activities) required for a process protocol and the relationships between the required tables (which, if needed, may be dependent on the selected activities), a transformation is generated in the internal computer system, which extracts data from the necessary attributes of the tables relevant for a process protocol and under consideration of the relevant relationships between the tables relevant for the process protocol, and stores the extracted data as process protocol. The extraction of the data is carried out by using the necessary filter criteria, if needed.

The process protocol thus created and stored may now be made available to a Process Mining System, in order to analyze the processes stored in the process protocol.

Each data set stored in the process protocol represents a process step (activity/event) of a process executed in the external computer systems EC1 to EC3. Process steps of several processes may be stored in the process protocol.

The data structure of the process protocol, hereby, comprises at least
- a first attribute, in which a unique identifier of the process of the respective process step is stored,
- a second attribute, in which an identifier of the respective process step is stored, and
- a third attribute, in which a sequence of the process steps within a process is stored.

The sequence of the process steps within a process may be indicated by the time stamp mentioned above, which is read out for each activity (process step) from the corresponding tables.

The unique identifier of the process, for example, may be read out from the base table. For orders, which are stored in the table T3, for example, the (unique) order number may be read out and may be used as process identifier in the process protocol.

The identifier of the respective process step (which does not have to be unique) may be determined from the column name and/or table name and/or from the attribute values. Example: in the table T3, there are the columns "created" and "confirmed", in which for each order, the creation date and (if confirmed) the confirmation date are stored. The table T3 is named "orders". For the activities (process steps) "creation of an order" and "confirmation of an order" mentioned above, the identifiers "order created" (from the table name "orders" and the column name "confirmed") may be created and may be stored for the respective process step in the third attribute of the process protocol.

It is advantageous, if the process protocol or the data sets stored therein, at first, are sorted according to the first attribute and then according to the third attribute. Thereby, the process steps belonging to a process are present in a grouped form, wherein at the same time, the process steps belonging to a process are sorted chronologically.

The process protocol may be stored in the main memory completely or partially. Further, it is advantageous, if the process steps belonging to a process are stored in the main memory in adjacent addresses, and in particular, according to the third attribute. Thereby, predecessor/successor relationships of the process steps may be determined within a process in an advantageous manner without the predecessor/successor relationships having to be stored. Namely, in an purely sequential process (without parallel partial processes), the predecessor/successor relationship results directly from the addresses, in which the process steps are stored. Moreover, the Process Mining System may read and process the process protocol as a stream sequentially and in the correct order from the main memory. Thus, for example, in O(n) a complete process graph can be created and visualized, which comprises the process steps of all processes stored in the process protocol. Moreover, in O(n), for processes with parallel partial processes, a complete process hierarchy can be created, which may then be visualized as process graph, too.

The possibility of the linear processing of the process protocol in the Process Mining System is of fundamental significance, because typical process protocols (e.g., in a company that processes several hundred thousands of orders from the creation of the order up to the payment of the ordered goods annually, wherein each order may comprise up to hundred or more activities) comprise several millions up to several hundred million activities (data sets).

For the first time creation of the process protocol (by executing the transformation), the data of the tables imported into the internal computer system may be used. However, for this it is also possible to use the data stored in the external computer systems EC1 to EC3.

After the first time creation of the process protocol, the transformation may be executed periodically, if needed, or according to certain rules, for example, every 10 minutes. At each execution of the transformation, the activities added into the external computer systems since the last execution of the transformation are extracted and added to the process protocol.

Above, a method according to the invention has been described with reference to external computer systems EC1 to EC3, which are systems, by means of which business processes may be handled.

With respect to the external systems EC1 to EC3, however, physical entities, as machines, which, for example, provide data within the scope of processing a product along a production and/or processing line, which we present an activity or a process step of a production process may also be concerned. This data may be stored in a storage device assigned to the machine, for example, in tables of a database system. These tables may then be imported into the internal computer system described above in order to create the process protocols according to the method described above.

Thus, with respect to the external system EC1, a grinding machine may be concerned. The grinding machine, for example, records the start and the end of a grinding process and stores this data together with a product identifier in the database assigned to it.

With respect to the external system EC2, a coating unit may be concerned, which is coupled to another database. The coating unit may comprise a sensor for measuring the applied coating thickness in order to repeat a coating process on a product, if needed, as long as the desired coating thickness is reached. The coating unit may record the start and the end of the entire coating process, as well as the start and the end of the respective repetitions together with the coating thicknesses measured respectively, and may store it together with a product identifier in the database assigned to it.

From the tables assigned to these two machines, the activities (process steps) may be determined according to a method according to the invention
- start of grinding
- end of grinding
- start of coating
- end of coating
- start of repetition of coating (together with the coating thickness measured)
- end of repetition of coating (together with the coating thickness measured).

By means of the product identifier, the single activities may be assigned to a certain processing process.

The process protocols created for this may be analyzed by a Process Mining System in order to recognize, for example, which products lead to a delay in a subsequent assembly process, because, for example, the coating process has to be repeated particularly often with respect to certain products.

Figure 2:
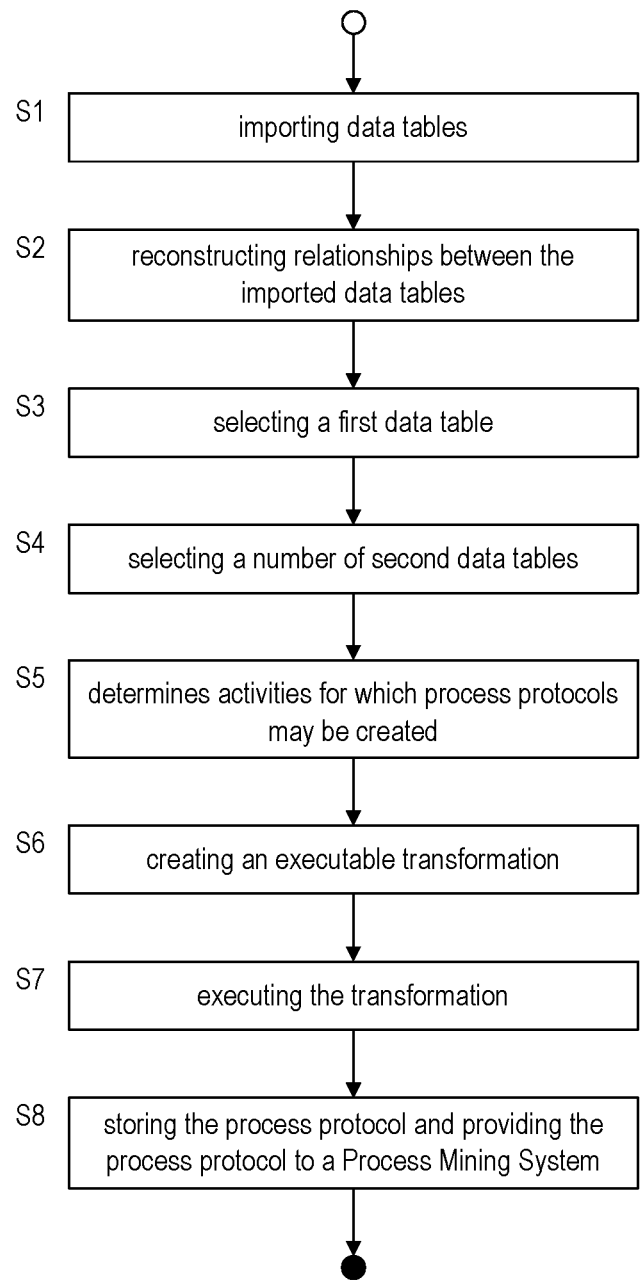
FIG. 2 shows a flow chart of the method of creating process protocols according to the invention.

FIG. 2 shows a flowchart of a method of creating process protocols according to the invention.

In a first step S1, the data tables are imported from different systems into the internal computer system. The different systems, from which the data tables are imported, may be the external computer systems EC1 to EC3 shown in FIG. 1, and/or production facilities, processing facilities, or other technical facilities, which provide data for processes/partial processes, which have been carried out. With respect to these systems, distributed systems (e.g., production facilities at different locations) and/or cloud systems may be concerned.

As far as the data tables to be imported are data from data base systems, the data tables may be imported into a data base system of the internal computer system directly.

However, the data tables to be imported do not necessarily have to be tables of a data base system. For example, the data to be imported may also be present as one or more structured text file/files. In this case, it is advantageous to nevertheless store the data in a data base system of the internal computer system. If needed, the data to be imported may be processed prior to being stored in the database system.

After the first step S1, all data of the external computer systems, for which the process protocols are to be created, is stored in the internal computer system.

In the following, four tables with exemplary data, which have been imported from external computer systems, are provided as an example, wherein the tables 1 and 2 have been imported from a first computer system (e.g., an On Premise ERP system), and the tables 3 and 4 have been imported from a second computer system (e.g., a Cloud CRM system) into the internal computer system.

TABLE T1

Order Information

| Order Number | Creation Date | Vendor | Price | Amount |
|---|---|---|---|---|
| 1 | 01.01.2018 | ABC | 100 | 10 |
| 2 | 24.01.2018 | XYZ | 2 | 12 |
| ... | ... | ... | ... | ... |

TABLE T2

Order History

| Date | Order Number | Field | Old value | New value | Who |
|---|---|---|---|---|---|
| 01.01.2018 | 1 | Price | 99 | 130 | Joe |
| 02.01.2018 | 1 | Amount | 9 | 7 | Joe |
| 03.01.2018 | 1 | Amount | 7 | 10 | Joe |
| 04.01.2018 | 1 | Price | 130 | 95 | Bill |
| 05.01.2018 | 1 | Price | 95 | 100 | Joe |
| ... | | ... | ... | ... | ... |

TABLE T3

Vendor Calls

| Vendor | Account Executive | Type | Reference ID | Date |
|---|---|---|---|---|
| ABC | George | Call | 1 | 02.01.2018 |
| ABC | George | Mail | 1 | 04.01.2018 |
| ... | ... | ... | ... | ... |

TABLE T4

Vendor Information

| Vendor | Create date | Country | State |
|---|---|---|---|
| ABC | 02.01.2017 | DE | BY |
| XYZ | 08.04.2017 | DE | BY |
| ... | ... | ... | ... |

After the data tables have been imported completely, in the second step S2, the relationships (foreign key relationships) between the individual data tables, which have been imported, are reconstructed. With respect to the four tables mentioned above, this would be the following relationships:
a) T1 (Order Number)←→T2 (Order Number)
b) T1 (Order Number)←→T3 (Reference ID)
c) T2 (Order Number)←→T3 (Reference ID)
d) T3 (Vendor)←→T4 (Vendor)
e) T3 (Vendor)←→T1 (Vendor)

Hereby, Tn (x)←→Tm (y) means that the tables Tn and Tm are linked to each other via the attribute x in the table Tn and via the attribute y in the table Tm.

In order to reconstruct the relationships between the imported data tables, it may be advantageous to also import so-called scheme tables, besides the data tables, from the external computer systems. In the scheme tables, information with respect to the relationships amongst the imported data tables may be stored.

Thus, scheme tables may be imported for the tables T1 to T4 mentioned above from the first computer system and from the second computer system. In the scheme tables from the first computer system, the relationships between the tables T1 and T2 are stored, in the scheme tables from the second computer system, the relationships between the tables T3 and T4 are stored.

Then, using the scheme tables, the relationships between the tables T1 and T2 and between the tables T3 and T4, respectively, may be reconstructed automatically.

Also without using the scheme tables mentioned above, the relationships between the tables T1 and T2 and between the tables T3 and T4, respectively, may be reconstructed automatically. For example, this is possible, if
  an attribute (column name) of the one data table is identical or similar to an attribute (column name) of the other data table, or
  the combination of table name and column name is identical or similar to a column name of another data table (e.g., the table "Vendor" comprises a first column "ID" and the table "Order" comprises a column "VendorID"—in this case, the tables "Vendor" and "Order" would be linked to each other via the attributes "ID" and "VendorID").

Thus, for the tables mentioned above, the relationships
T1 (Order Number)←→T2 (Order Number)
T3 (Vendor)←→T4 (Vendor)
may also be constructed without scheme tables automatically.

Moreover, also the relationship
T3 (Vendor)←→T1 (Vendor) could be recognized automatically, although the tables T1 and T3 have been imported from different external systems.

For the automatic recognition of the relationships between the tables T1 and T3 and between the tables T2 and T3 (T1 and T2 have been imported from another computer system than the table T3), further heuristics may be used. For example, the column name may be analyzed (e.g., if the column name comprises the text component "ID", then it may be assumed with a high probability that in this column foreign key values are stored). Alternatively or additionally, also the imported scheme tables may be used in order to determine the primary key attributes and the foreign key attributes for the imported tables.

For the table T1, for example, the attribute "Order Number" may be determined based on the imported scheme tables as primary key attribute. For the table T3, for example, the attribute "Reference ID" may be determined based on an analysis of the column names as foreign key attribute. Thereby, the relationship T1 (Order Number)←→T3 (Reference ID)
may be determined automatically.
Analogously, also the relationship
T2 (Order Number)←→T3 (Reference ID)
may be determined automatically.

The relationships between the tables T1 to T4 thus determined may be confirmed by a user. Additionally, it may be provided for a user creating/adding additional relationships (as relationships, which have not been determined automatically) or deleting existing relationships again (as relationships, which have been determined by the system incorrectly).

After the relationships have been reconstructed, a valid data base scheme exists in the internal computer system, which describes the tables and their relationships to each other for all tables T1 to T4 imported from the external computer systems. If these tables or a subset of these tables are imported into the internal computer system at a later point of time, for example, in order to create other process protocols, then, the internal computer system may use this valid data base scheme in order to determine relationships between the tables. In this respect, the internal computer system is configured so as to be self-learning, i.e., it successively learns relationships between imported data tables such that the computer system may use these relationships learned at a later point of time.

After the relationships have been determined and, if needed, have been stored, in the subsequent step S3, business objects (also referred to as Case Object) are determined, which are suitable for the creation of a process protocol. Hereby, such data tables are selected, in which such business objects are stored (or, however, are stored with a high probability). Advantageously, this is carried out automatically.

In the present example, the internal computer system may recognize the tables T1 (orders) and T4 (vendors) as business objects. Namely, the table T1 stores base information with respect to orders, and the table T4 stores base information with respect to vendors. The tables T2 and T3, on the other hand, store change information (table T2: price changes/changes in the amount of an order) and actions (table T3: vendor cards), respectively.

If the internal system finds several business objects to be suitable for the creation of a process protocol, one of the business objects may be selected by a user. The internal computer system may store information with respect to the selected business object such that the internal computer system may use this information at a later point of time. If a method according to the invention is carried out several times, the internal system learns successively, which business objects have been determined for how many times, and which business objects have been selected by a user for how many times. The data table belonging to the selected business object is also referred to as first data table (in FIG. 1 above, also referred to as base table).

In this example, the business object orders (data table T1) is selected.

In a further step S4, the internal computer system, starting from the selected business object (orders) or starting from the first data table (T1), respectively, then determines further data tables (also referred to as the second data tables), which may be suitable for the creation of process protocols. For the first data table T1, this would be the data tables T2 and T3, which, on the one hand, are related to the first data table T1 directly, and on the other hand, store change information and actions, respectively.

Based on the first data table T1 and the second data tables T2, T3, and the relationships between these data tables, the internal computer system determines activities, for which process protocols may be created, in the subsequent step S5.

For the data tables T1, T2, and T3, the internal computer system, in this example, determines the following activities:

Create Order based on the table T1 and the attribute "Creation Date" of the table T1

Change Price based on the table T2 and the attribute "Date" of the table T2 as well as the attribute "Field" of the table T2, whereby attribute values of the attribute "Field" are filtered (Field=Price)

Change Amount based on the table T2 and the attribute "Date" of the table T2 as well as the attribute "Field" of the table T2, whereby attribute values of the attribute "Field" are stored (Field=Amount)

Change Order based on the table T2 and the attribute "Date" of the table T2

Call Vendor based on the table T3 and the attribute "Date" of the table T3

The relationships of the activities may be created by the internal computer system automatically, for example, from the table names and the respective date attribute (e.g. "Create Order" from "Order Information" and "Creation Date").

With respect to the activities "Change Price" and "Change Amount" determined above, the internal computer system, moreover, creates a filter based on the attribute "Field" in order to filter certain activities in the table T2. Hereby, the computer system may assume that due to the table name "Order History" and the column "Field" occurring in this table, the table T2 stores changes for various fields (e.g., Price and Amount) of the table T1 (T1 and T2, in fact, are linked to each other via the columns Order Number).

Subsequently, based on these activities, several process protocols may be created, for example, a process protocol for orders or a process protocol for changes of orders.

These activities, however, may also be combined, in order to, for example, create process protocols for higher-level processes. Thus, for example, it is possible to create a process protocol, by means of which changes of orders may be analyzed based on vendor calls.

Now, a user may select one or more activities, for which one or more process protocols are to be created. If the user selects several activities, then the internal computer system may create a process protocol for that activity or a common process protocol for all selected activities upon instruction of the user.

Alternatively, the computer system may also create a process protocol without user interaction for all activities, which have been respectively determined automatically.

In the subsequent step S6, the internal computer system creates an executable transformation for every selected activity (or alternatively, for all activities or for combinations of activities) by means of which the data from the external computer systems EC1 to EC3 may be transformed into a process protocol.

The transformation, when executed, extracts data at least from the necessary attributes of the tables relevant for the respective process protocol, and under consideration of the relevant relationships between the tables relevant for the respective process protocol, and stores the extracted data as process protocol. The extraction of the data is carried out by using the possibly necessary filter criteria, which may be prescribed by the respective activities.

Then, the transformation thus created is stored and is executed in the step S7.

The process protocol created by the execution of the transformation is stored and is made available to a Process Mining System for being analyzed.

The transformation may be carried out a couple of times, for example, periodically, whereby the process protocol may be enriched by new process steps carried out in the external systems or by newly executed processes.

Each data set of a process protocol, hereby, represents a process step (activity/event) of a process executed in the external computer systems, whereby also process steps of several processes may be stored in the process protocol.

In any case, the attributes necessary for the creation of the process protocol are
 a unique identifier of the process of the respective process step,
 an identifier of the respective process step, and
 a sequence of the process steps within a process.

If a process protocol is to be created for the activity Change Order mentioned above, then, for each data set of the process protocol, the attribute values necessary for this would be
 Order Number (=identifier of the process),
 "Name" (=identifier of the process step—is created by the system automatically), and
 Date (=sequence).

Based on the tables listed above, for the activity Change Order, the following process protocol is obtained:

| Identifier of the process | Identifier of the process step | Sequence |
| --- | --- | --- |
| 1 | Change Price | 01.01.2018 |
| 1 | Change Amount | 02.01.2018 |
| 1 | Change Amount | 03.01.2018 |
| 1 | Change Price | 04.01.2018 |
| 1 | Change Price | 05.01.2018 |

The system may create the identifier of the respective process step from the values of the column "Field" automatically.

What is claimed is:

1. A computer-implemented method of creating a process protocol in a local computer system (LC), which comprises a processor and a storage device, wherein the process protocol encodes object related activities and is created from raw data, which is stored in part in a first external computer system (EC1) and in part in a second external computer system (EC2), wherein the raw data in the external computer systems is stored in a number of data tables, wherein the raw data comprises data, which is created during the execution of processes in the first external computer system and in the second external computer system, wherein a process comprises several process steps, wherein each process step creates the data during execution, and wherein the method comprises:

(a) importing the data tables from the first external computer system and from the second external computer system into the local computer system, and storing the imported data tables in the storing device of the local computer system, (b) in the local computer system, determining and reconstructing the relationships between the imported data tables, (c) in the local computer system, determining and selecting a first data table from the number of imported data tables, wherein each data record stored in the first data table represents an object for which the process protocol is to be created, (d) in the local computer system, determining and selecting a number of second data tables from the number of imported data tables, which are necessary for the creation of the process protocol, based on the selected first data table and based on the reconstructed relationships between the imported data tables, wherein each data record stored in the number of second data tables represents a process step, (e) in the local computer system, determining activities for the objects of the selected first data table based on the selected second data tables and the reconstructed relationships between the selected first data table and the selected second data tables, (f) in the local computer system, creating an executable transformation, which based on
 the selected first data table,
 the selected second data tables, and
 the relationships between the selected first data table and the selected second data tables
 is adapted to extract data from the first data table and from the second data tables based on the determined activities, and to store the extracted data as process protocol, and (g) in the local computer system, executing the transformation, wherein during execution of the transformation the data is extracted from the data tables stored in the external computer systems (ES1, ES2), and storing the extracted data as process protocol, and providing the created process protocol to a Process Mining System for analysis and reconstruction of the processes carried out in the first external computer system and in the second external computer system.

2. The method of claim 1, wherein at least one of the selected data tables is imported from the first external computer system (ES1), and at least one of the selected data tables is imported from the second external computer system (ES2).

3. The method of claim 1, wherein during reconstructing of the relationships between the imported data tables in the step (b), it is determined via which attributes the data tables are related to each other.

4. The method of claim 3, wherein two data tables are related to each other, if an attribute of the one data table is identical or similar to an attribute of the other data table.

5. The method of claim 1, wherein the relationships reconstructed between two imported data tables are stored, wherein the names of the two data tables, the respective attributes, and an assignment of the attributes of the one data table to the attributes of the other data table are stored.

6. The method of claim 1, wherein
 a first data model belonging to the data tables imported from the first external computer system (EC1) is imported from the first external computer system into the local computer system, wherein the relationships between the data tables imported from the first external computer system (EC1) are reconstructed based on the first data model, a second data model belonging to the data tables imported from the second external computer system (EC2) is imported from the second external computer system into the local computer system, wherein the relationships between the data tables imported from the second external computer system (EC2) are reconstructed based on the second data model, such that only the relationships between the data tables from the first external computer system and the data tables from the second external computer system have to be reconstructed without the use of a data model.

7. The method of claim 1, wherein during determining and selecting of a first data table in the step (c), it is determined, which data table meets one or more conditions, wherein the conditions are selected from a group, consisting of the data table comprises less data sets compared to the other data tables, the data table comprises an attribute, in which the time stamps are stored, the data table is referenced by a few other data tables, and combinations thereof.

8. The method of claim 7, wherein information with respect to the selected first data table is stored.

9. The method of claim 1, wherein during determining and selecting of the number of second data tables in the step (d) those data tables am selected, which meet one or mom conditions, wherein the conditions are selected from the group, consisting of the data tables comprise many data sets compared to the first data table, the data table is referenced directly or indirectly by the first data table, the data tables respectively comprise an attribute, in which the time stamps are stored, and combinations thereof.

10. The method of claim 9, wherein information with respect to the selected second data tables and with respect to the relationships between the selected second data tables and the first data table are stored.

11. The method of claim 1, wherein during creating of the executable transformation in the step (f) it is determined, which attributes of the selected first data table and of the selected second data tables are considered during extracting of the data.

12. The method of claim 11, wherein during executing of the transformation in the step (g) data sets are read out from the first data table and from the second data tables, wherein the data sets, which have been read out, comprise the attribute values of the attributes determined for the respective data table, wherein the data sets, which have been read out, are stored as process protocol, wherein each data set stored in the process protocol represents a process step (Event) of a process executed in the first external computer system and in the second external computer system.

13. The method of claim 12, wherein the data sets, which have been read out, are stored according to a predetermined data structure in the process protocol, wherein the predetermined data structure comprises at least:

a first attribute, in which a first unique identifier of the process of the respective process step is stored, a second attribute, in which an identifier of the respective process step is stored; and a third attribute, in which a sequence of the process steps within a process is stored.

14. The method of claim 13, wherein the attribute values of the attributes of the process protocol are determined from the attribute values of the data sets, which have been read out, and/or the table names and/or column names of the selected first data table and/or the selected second data tables.

* * * * *